May 21, 1968 J. DAVIDSE 3,384,706

CIRCUIT ARRANGEMENT FOR CONVERTING A COLOR TELEVISION SIGNAL

Filed Sept. 16, 1965

INVENTOR.

JAN DAVIDSE

BY

Frank R. Trifari

AGENT 3,384,706

CIRCUIT ARRANGEMENT FOR CONVERTING A COLOR TELEVISION SIGNAL

Jan Davidse, Rotterdam, Netherlands, assignor to North American Philips Company, Inc., New York, N.Y., a corporation of Delaware Filed Sept. 16, 1965, Ser. No. 487,660
Claims priority, application Netherlands, Sept. 19, 1964, 64—10,974
7 Claims. (Cl. 178—5.4)

ABSTRACT OF THE DISCLOSURE

A system for converting PAL to NTSC color television signals, and vice versa, in which alternate lines of the signal are applied to two signal channels, and the outputs of the channels are added to produce the converted signal. One of the channels includes a mixer for multiplying the signals by oscillations of twice the color subcarrier frequency.

The invention relates to a circuit arrangement for converting a color television signal built up according to the PAL (Phase Alternative Lines) system into a signal built up according to the NTSC (National Television System Committee) system, and conversely, in which the television signal contains, in addition to the luminance signal, two color components modulated in quadrature on a sub-carrier wave and in which, in particular in the PAL signal, one of the said color components is shifted in phase through 180° from line to line and which device comprises a switch, means for the line-wise switching of the said switch, and an adding stage.

Such a converting circuit may be desired in many circumstances. First of all it is possible with it to use a television receiver, which can be used for the NTSC system, also for receiving a signal built up according to the PAL system.

Secondly, it is intended to perform the transmission from station to station (for example from transmitting station to relay station or from relay station to relay station) according to the PAL system, whereas from the station which provides for the transmissions to the receivers, the color television signal built up according to the NTSC system will be transmitted. Of course, this latter station must comprise a converting device.

However, the circuit arrangement according to the invention is also suitable for converting a signal built up according to the NTSC system into a signal built up according to the PAL system. Such a conversion may be necessary, for example, when an NTSC signal is received from the United States of America or from Japan through a relay satellite and the said NTSC signal has to be converted in Europe into a PAL signal.

This may be achieved by means of a converting device according to the invention which is characterized in that the color components modulated on the subcarrier wave reach the adding stage through at least two paths, at least one of the said two paths comprising a mixer stage to which is applied a signal with the double subcarrier wave frequency in addition to the color components and in which the switch which comprises one input terminal and two output terminals is included in at least one of the two paths.

In order that the invention may readily be carried into effect a few possible embodiments of converting devices according to the invention will now be described in greater detail, by way of example, with reference to the accompanying figures, in which.

Figures 1, 2, 3, 4:
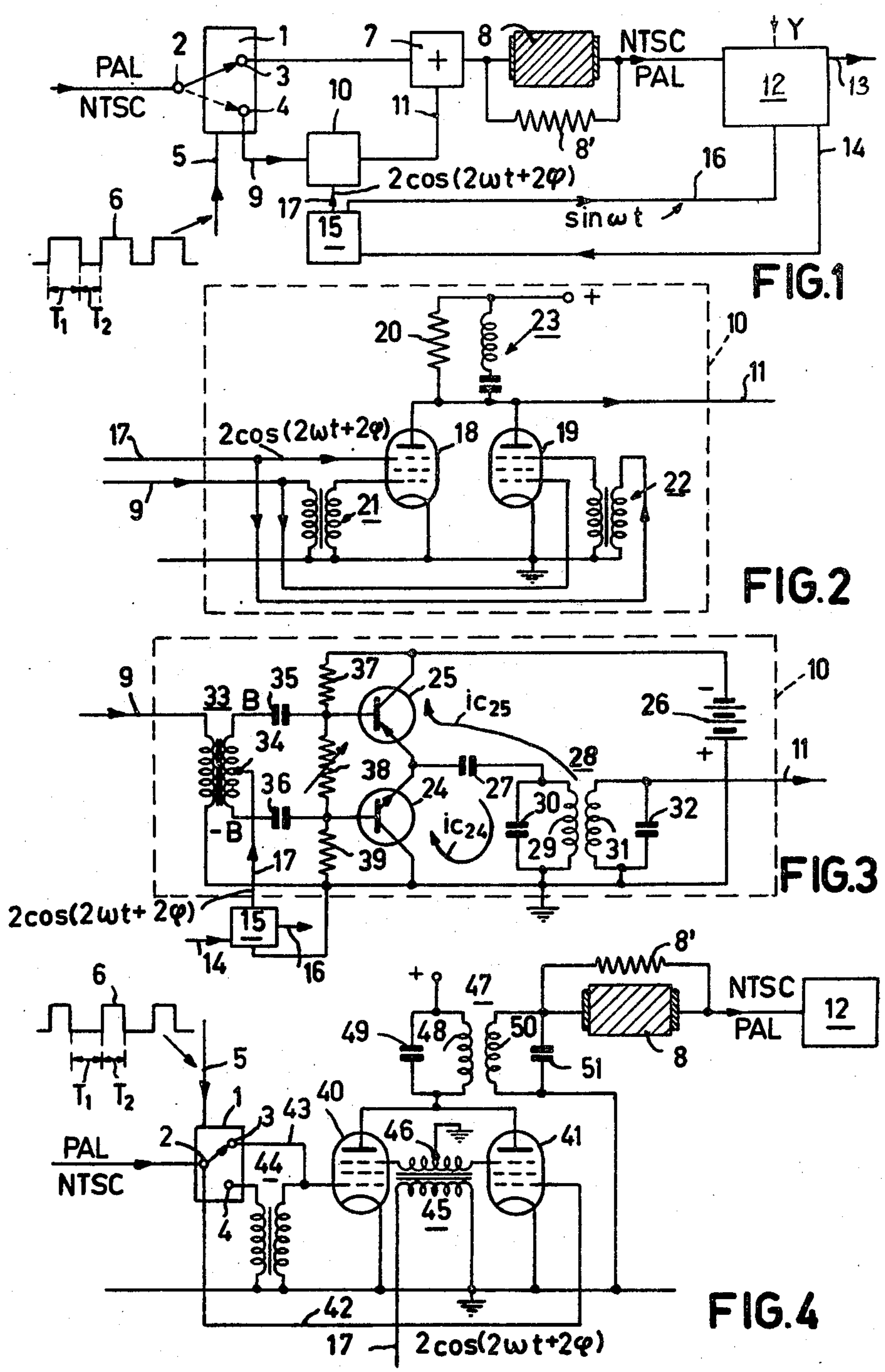
FIG. 1 shows a first embodiment of a circuit arrangement according to the invention.
FIG. 2 shows a possible push-pull mixer stage provided with tubes as it may be used in the circuit arrangement shown in FIG. 1.
FIG. 3 shows a possible push-pull mixer stage with transistors to be used in the circuit arrangement shown in FIG. 1.
FIG. 4 shows a second embodiment of a circuit arrangement according to the invention.

In FIG. 1 refrence numeral 1 denotes the switch which comprises an input terminal 2, a first output terminal 3 and a second output terminal 4.

The color television signal, which, as shown in FIG. 1, may be a PAL signal or an NTSC signal, is applied to the input terminal 2.

This color television signal consists of a luminance signal Y and two color components P and R which are modulated in quadrature on the subcarrier wave. When the signal is built up according to the NTSC system the total color television signal exclusively has a shape as shown in Equation 1

$$E_N = Y + A \qquad (1)$$

that is to say, the color television signal always has the same shape from line to line.

When the color television signal is built up according to the PAL system, the said signal during one line has a shape as shown by Equation 1 and during the next line has a shape as shown by Equation 2

$$E_R = Y + B \qquad (2)$$

The difference between the signals A and B as shown in the Equations 1 and 2 appears from the Equations 3 and 4.

$$A = P\cos(\omega t + \varphi) + R\sin(\omega t + \varphi) - b\sin\omega t \qquad (3)$$

$$B = P\cos(\omega t + \varphi) - R\sin(\omega t + \varphi) - b\sin\omega t \qquad (4)$$

As is known, the difference between the signals A and B is that one of the color components P or R is shifted in phase through 180° from line to line. In the case of the Equations 3 and 4 the color component R is chosen for this purpose but it will be clear that the same can also be done with the color component P instead of with R. In addition, in the Equations 3 and 4 $\omega$ represents the angular frequency of the subcarrier wave, $\varphi$ the phase angle at which the two color components are modulated on the subcarrier wave and $b$ the amplitude of the burst signal, the color synchronisation signal which is transmitted only during the line flyback periods.

For $\varphi = 0$, $P = R - Y$, being the red color difference signal and $R = B - Y$ being the blue color difference signal. For $\varphi = 33°$, $P = I$ being the color component with the large bandwidth and $R = Q$, being the color component with the small bandwidth the components I and Q being the known components of the NTSC signal. Both the component I and the component Q are composed of the basic colors red (R), green (G) and blue (B). The same holds good for the luminance signal Y so that also when the color difference signals $R-Y$ and $B-Y$ are used the green color difference signal $G-Y$ can be derived in known manner from the said two color difference signals.

The luminance signal Y need not be converted and consequently this luminance signal Y will not be further considered below.

Through the line 5 a switching signal 6 is applied to the switch 1 which has to switch the switch 1 linewise. In this case, the switch 1 as to connect the input contact 2 to the first output contact 3 during substantially a whole line, namely during a line that the signal A is transmitted, whereas during the next line that is to say a line at which the signal B is also transmitted, the input terminal 2 is connected to the second output terminal 4.

The switch 1 may be provided in known manner with two diodes which are alternately brought in the conducting condition by the switching signal 6. The switching signal 6 can be obtained, also in known manner, by means of a bistable monostable multivibrator which is controlled by the line synchronising pulses or the line flyback pulses. This multivibrator must be synchronised with the so-called pulse synchronisation signal which is also transmitted with the PAL signal during the vertical synchronisation pulses (see Telefunken Zeitung, volume 36, 1963, Heft ½, pages 86 and 87).

An adding stage 7 is directly connected to the output terminal 3. The output terminal of the adding stage 7 is connected to a delay circuit 8 of the accoustic type which has a delay time corresponding to one line period. Parallel to the delay line 8 a resistor or impedance 8' is connected which does not delay the output signal of the adding stage 7 but attenuates it equally as much as the delay circuit 8.

A line 9 is connected between the output terminal 4 and an input terminal of a mixer stage 10. The output terminal of the said mixer stage is connected through a line 11 also to the adding stage 7 in which the signals from the terminal 3 and from the mixer stage 10 are added. When a pulse signal is applied to the input terminal 2, an NTSC signal is formed at the output terminal of the adding stage 7. This signal is then applied to a device 12 which processes the converted color components, that is to say, demodulates the said signal or renders it suitable in a different manner for being applied to a color television picture tube which can reproduce the color image together with the luminance signal Y. Therefore the output terminal 13 of the device 12 connects the said device to the picture tube which is not shown in FIG. 1.

The burst signal may also be derived from the device 12 through line 14 and the be applied through the said line to the device 15. The device 15 comprises a local oscillator for generating the subcarrier wave and reactance circuit which is controlled by means of a signal derived from the burst signal. This serves for synchronising the local oscillator. It is ensured in this manner, that the subcarrier wave signal regenerated in the device 15 runs in synchronism with the burst signal received from the transmitter.

On the one hand the local oscillator produces a signal with the angular frequency $\omega$, that is to say a signal which has the same frequency as the subcarrier wave on which the two color components P and R are modulated in quadrature, and on the other hand a signal with the angular frequency $2\omega$, that is to say, a signal which has the double subcarrier wave frequency. The signal with the angular frequency $\omega$ is applied through line 16 to the device 12 and serves for the synchronous demodulation of the color components P and R. The signal with the double frequency is applied through line 17 to the mixer stage 10. This signal has a shape as given by the equation $$2\cos(2\omega t+2\varphi) \qquad (5)$$

The operation of the circuit arrangement shown in FIG. 1 when a pulse signal is received is as follows. When during a certain line the signal A is received the contacts 2 and 3 are interconnected and the signal A is applied directly to the adding stage 7 without any conversion. During the subsequent line the contacts 2 and 4 are interconnected and since the signal B is received during the said line, this signal B will be applied to the mixer stage 10. However, the signal given according to Equation 5 is also applied to the mixer stage 10, so that in the mixer stage 10 mixing will occur, as result of which a signal according to Equation 6 will be formed at the output circuit of the mixer stage 10:

$$B.2\cos(2\omega t+2\varphi)=P\cos(3\omega t+3\varphi)+P\cos(\omega t+\varphi) -R\sin(3\omega t+3\varphi)+R\sin(\omega t+\varphi)-b\sin(3\omega t+2\varphi) +b\sin(\omega t+2\varphi) \qquad (6)$$

As appears from Equation 6 the output signal still contains terms with $3\omega$, that is to say, that this signal contains terms which have the three-fold frequency as compared with the frequency of the subcarrier wave signal. These terms are undesired and must be removed from the output signal by means of a filter included in the mixer stage 10. Therefore the ultimate signal which is formed at the output terminal 11 will have a shape as given by the equation $$P\cos(\omega t+\varphi)+R\sin(\omega t+\varphi)+b\sin(\omega t+2\varphi) \qquad (7)$$

The signal represented by Equation 7 is equal to the signal A as represented by Equation 3 with the exception of the burst signal which has obtained a different phase. This is undesired since after adding stage 7 a resulting burst signal is obtained which has a phase which deviates from that of the burst signal obtained from the transmitter as is indicated in the Equations 3 and 4. However, this drawback can be avoided in a simple manner by making the switching signal 6, which has to switch the switch 1, asymetrical, that is to say, by chosing the time $T_1$ to be longer than the time $T_2$. During the time $T_1$ the switch 1 connects the input terminal 2 to the first output terminal 3 and during the time $T_2$ the switch 1 connects the input terminal 2 to the second output terminal 4. When the time $T_2$ is chosen to be equal to the stroke period of a line and the time $T_1$ is chosen to be equal to the stroke period plus the time of two line flyback periods, the burst signal $b\sin\omega T$ will be applied to the mixer stage 10 since the input terminal 2 is not connected to the second output terminal 4 during any of the line flyback periods, the period that the burst signal is also transmitted.

How such an asymmetrical signal can be obtained is described in copending patent application Ser. No. 487,-658, filed Sept. 16, 1965. When it is not desired to produce such an asymmetrical signal, the burst signal can be obtained by deriving the burst signal immediately from the input terminal 2 by means of a gate circuit to be gated.

It has also been assumed above that the color component R is shifted in phase from line to line through 180°. However, it will be celar, that instead of the color component R also the color component P can be shifted in phase through 180° from line to line. In that case the signal B does not have the shape as indicated by Equation 4 but a shape according to Equation 8.

$$B'=-P\cos(\omega t+\varphi)+R\sin(\omega t+\varphi) \qquad (8)$$

It will be clear that now the signal with the double subcarrier wave frequency which is applied to the mixer stage 10 must not have a shape as given by the Equation 5 but that this signal also has to be shifted 180° in phase and consequently must be of the shape $$-2\cos(2\omega t+2\varphi) \qquad (9)$$

In this case also the signal according to Equation 8 will be converted to the signal A after the conversion in the mixer stage 10 (not counting the burst signal) which, for example, as result of the described choice of the switching signal 6, will not occur in the signal present at the line 11.

The circuit arrangement as described in FIG. 1 can be used for a so-called $PAL_{dl}$ receiver. A $PAL_{dl}$ receiver is a receiver in which signals of successive lines have to be added together electrically that is to say by means of a delay circuit (delay line), so as to ensure that phase errors which have occurred in the transmission path can be averaged out. For that purpose the delay line 8 is provided in the circuit arrangement shown in FIG. 1, which delays the signal over one line period. The non-delayed signal is applied through 8′ so that each time the signals of two successive lines are added at the junction of 8 and 8′. In the so-called $PAL_v$ receiver, for visual averaging, this adding is effected optically, that is to say, it is expected that the eye averages or integrates signals of two successive lines. Therefore, in such a receiver the delay circuit 8 with associated impedances 8′ may be omitted.

When an NTSC signal is received and when this NTSC signal need not be converted, it will be clear that by deactuating the switch 1 the NTSC signal will automatically appear at the output terminal of the adding stage 7 because the path through the mixer stage 10 remains deactuated. This can be obtained in a simple manner by switching off the switching signal 6 when an NTSC signal is received. If required this may be effected automatically in that, when an NTSC signal is received, the PAL synchronisation signal does not appear and this non-appearance of the PAL synchronisation signal may be used as a source of information to control a gate circuit for switching on and off the switching signal 6.

As described in the preamble, it is also possible with the device shown in FIG. 1 to convert an NTSC signal into a PAL signal. This may be necessary, for example, when an NTSC signal is received from the United States of America or from Japan via a relay satellite, which signal has to be converted into a PAL signal in Europe. Said conversion may also be necessary when on the transmitter side an NTSC signal is normally produced but the said signal has to be transmitted to other countries also through relay stations, for example, in the case of Eurovision transmissions. When the relay stations transmit according to the PAL system, the NTSC signal produced in the original transmitter must first be converted into a PAL signal before it can be transmitted to the relay stations.

The NTSC signal then applied to the terminal 2 comprises during each line the signal A as represented by the Equation 3. During one line this signal A is normally applied through terminal 3 to the stage 7 but during the other line the signal is applied through the switch 1 to the terminal 4 and thence through the line 9 to the mixer stage 10. In the mixer stage 10 either the color component R is shifted in phase through 180° when a signal according to Equation 5 is applied to it, or the color component P is shifted in phase through 180° when a signal according to Equation 9 is applied to the mixer stage 10. In the first case a signal B according to Equation 4 is formed at the output terminal 11, in the second case the signal B′ according to Equation 8. This signal is applied to the adding stage 7. It will be clear that in the case of conversion of an NTSC signal into a PAL signal the delay circuit 8, with associated impedance 8′, may be omitted since it is then necessary that during one line the signal A is formed at the output terminal of the adding stage 7 and, during the next line, the signal B and the signal B′ respectively are formed. Since the switch 1 switches in a linewise manner, this is achieved by simply omitting the delay circuit 8 and the impedance 8′.

When an NTSC signal has to be converted into a PAL signal and when this converted signal is then transmitted, the device 12 may be constructed as a modulator to which are applied the main carrier wave and the luminance signal Y. The total color television signal modulated on the main carrier wave is then derived from the output terminal 13 which signal is suitable for transmission to a relay station or to receivers.

FIG. 2 shows a possible embodiment of the mixer stage 10 with tubes. This must preferably be a push-pull mixer stage because, as appears from Equation 6, the mixing in stage 10 must be a pure multiplication which involves that at the output terminal 11 only the product term $$B.2\cos(\omega 2t+2\varphi)$$

may be present and not the applied signals $B$ and $K=\pm 2\cos(2\omega t+2\varphi)$ at that. This is possible with the push-pull stage 10 shown in FIG. 2. This stage comprises two parallel arranged pentode tubes 18 and 19 which are provided with a common anode resistor 20. A filter 23, which serves for eliminating the terms with angular frequency $3\omega$ as they occur in Equation 6 is arranged parallel to the resistor 20.

The signal B and B′ respectively derived from the line 9 is applied to the first control grid of the tube 19 and the same signal is applied to the first control grid of the tube 18 but after it has been shifted in phase through 180° in transformer 21. Thus a signal −B and −B′ respectively is operative at the first control grid of the tube 18. The signal derived from the line 17 with the double subcarrier wave frequency, for convenience termed signal K (so K may be the signal given by Equation 5 or by Equation 9), is directly applied through the second control grid of the tube 18 and, through a second transformer 22, to the second control grid of the tube 19. Consequently a signal K is operative at the second control grid of the tube 18 and a signal −K is operative at the second control grid of the tube 19.

Therefore it may be written with some approximation for the anode current of the tube 18 that:

$$i_{a18}=-S_1B+S_2K-S_3B.K \qquad (10)$$

For the anode current of the tube 19 it may be written that:

$$i_{a19}=S_1B-S_2K-S_3B.K \qquad (11)$$

In the Equations (10) and (11) $S_1$ is the slope at the first control grids, $S_2$ the slope at the second control grids of the tubes 18 and 19, and $S_3$ is the conversion slope. Since the anodes of the tubes 18 and 19 are connected together and to the common anode resistor 20, the voltage drop across the resistor 20 is given by:

$$V_{a20}=(i_{a18}=+i_{a19})R_{20}=-2S_3B.K.R._{20} \qquad (13)$$

which also is the output signal at the terminal 11. From the last equation it clearly appears that the said output signal exclusively contains the product term. Naturally, the conversion amplification in the stage 10, determined by the slope $S_3$ and the resistance value $R_{20}$ of the resistor 20, must be such that the signal from the stage 10 has the same amplitude as the signal which is directly applied to the adding stage 7. Since a given conversion amplification occurs in the mixer stage 10 it may be recommendable to include an amplifier between the terminal 3 and the adding stage 7, the amplification of the said amplifier being equal to the conversion amplification of the stage 10.

A second embodiment of the mixer stage 10 with transistors is shown in FIG. 3. The mixer stage 10 shown in FIG. 3 comprises two transistors 24 and 25 of opposite conductivity types, namely the transistor 24 is of the NPN type and the transistor 25 is of the PNP type. The said two cascade-arranged transistors 24 and 25 are connected to a supply voltage source 26 the positive terminal of which is connected to earth. As is shown in FIG. 2 the emitter electrodes of the two transistors are connected together and the output signal is derived from these interconnected emitter electrodes. For that purpose the said interconnected emitter-electrodes are connected through a capacitor 27 to the load constituted by a band filter 28. This band filter is formed on the one hand by a primary circuit comprising an inductance 29 and a capacitor 30, and a secondary circuit comprising an inductance 31 and a capacitor 32. The inductances 29 and 31 are magnetically coupled together and the whole band filter is tuned to the angular frequency $\omega$ being the angular frequency of the subcarrier wave.

The color television signal B according to Equation 4 is applied to the line 9.

The primary of a transformer 33 is connected to the line 9, the secondary of which is provided with a central tapping 34 which is connected to earth through the source 15. One end of the secondary is connected through the capacitor 35 to the base electrode of the transistor 25 and the opposite end is connected through the capacitor 36 to the base electrode of the transistor 24. In addition, the said base electrodes are provided with the required bias voltages by means of a potentiometer consisting of the resistors 37, 38 and 39. The resistor 38 is a variable resistor so as to be able to adjust the correct balance point of the said push-pull mixer stage. Because the centre tapping 34 is connected to the source 15, the signal according to Equation 5 is operative at the said centre tapping which in this case also is termed K for convenience.

The centre tapping 34 may be considered to be earthed for the signal B so that a signal +B is operative at the capacitor 35 and a signal −B is operative at the capacitor 36. Since the transistors 24 and 25 are of opposite conductivity types but the signals B and −B respectively at the capacitors 35 and 36 are in opposite phases the collector current $i_{c24}$ and $i_{c25}$ of the transistors 24 and 25 produced by the said signals B will again be in phase.

The signal K derived from the source 15 is applied to the centre tapping 34 and therefore appears in phase at the base electrodes of the two transistors. Because the transistors 24 and 25 are of opposite conductivity types, the signal K at their base electrodes will cause collector currents which are in opposite phases.

In addition, additive mixing of the signals K and B occurs in the two transistors and the resulting mixed products will give product terms because the signals K and B are applied to the two transistors in phase and in opposite phases respectively which terms will be of opposite sign for one transistor with respect to those in the other transistor. From these considerations it follows that the collector current $i_{c24}$ of the transistor 24 is given by Equation 14

$$i_{c24}=S'_1K+S'_1B+S'_3K.B \qquad (14)$$

and the collector current $i_{c25}$ of the transistor 25 is given by the Equation 15

$$i_{c25}=-S'_1K+S'_1B-S'_3K.B \qquad (15)$$

in which $S'_1$ is the slope for the direct amplification and $S'_3$ the slope for the conversion amplification.

From FIG. 3 is follows that the collector currents $i_{c24}$ and $i_{c25}$ flow through the band filter 28 with opposite signs. Therefore it may be written for the resulting current $i_{28}$ through the band filter 28 that $$i_{28}=i_{c24}-i_{c25}=+2S'_1K+2S'_3K.B \qquad (16)$$

A consideration of Equation 16 proves that the current $i_{28}$ contains, in addition to desired product terms of the signals K and B, a term $2S'_1.K$ which is exclusively determined by the signal K being the signal with the double subcarrier wave frequency. Since, however, the band filter 28 is tuned to the angular frequency $\omega$ the signal with the double subcarrier wave frequency will not appear at the output terminal 11. This means that at the output terminal 11 only the desired product term appears.

Although satisfactory results can be obtained with the circuit arrangement shown in FIG. 1 and the associated mixer stage 10, this circuit has the drawback of being rather complicated since the mixer stage 10 itself must be constructed as a push-pull stage. In addition, it will usually be necessary in practice to include an additional amplifier between the terminal 3 and the adding stage 7. In that case it must be ensured that the amplification of the said additionally included amplifier stage is equal to the conversion amplification of the mixer stage 10. In addition to an extra amplifier element, this means a critical adjustment because a direct amplification must be made equal to a conversion amplification. In order to avoid these drawbacks a simple embodiment is shown in FIG. 4. In this FIGURE 4 the push-pull mixer stage 10 and the additional amplifier are combined, as it were.

The circuit arrangement shown in FIG. 4 comprises two pentode tubes 40 and 41. The first control grid of the tube 41 is connected through line 42 to the input terminal 2 of the switch 1.

The first control grid of the tube 40 is connected at one end to the first output terminal 3 of the switch 1 through line 43 and at the other end to the second output terminal of the said switch through a transformer 44. Since the switching contact of the switch 1 will be switched from line to line by means of the switching signal 6, this means that during one line a non-inverted signal is applied to the first control grid of the tube 40 and, during the next line, an inverted signal is applied. Therefore, when a PAL signal is applied to the input terminal 2, this means that during one line a signal A according to Equation 3 is applied to the first control grid of the tube 40 and a signal B according to Equation 4 is applied during the next line which signal, however, is shifted in phase through 180° in the transformer 44. Since the first control grid of the tube 41 is directly connected to the terminal 2, a signal A is applied to the first control grid of the said tube during one line and a signal B is applied during the next line. Now it has been assumed that during the odd lines, during which the signal A is transmitted, the contacts 2 and 3 are interconnected, while during the even lines, during which the signal B is also transmitted, the contacts 2 and 4 are interconnected.

The signal with the double subcarrier wave frequency derived from the source 15 is again applied to the terminal 17. A transformer 45 is connected to the terminal 17, the secondary of which is provided with a centre tapping 46 which is connected to earth. The ends of the said secondary are connected to the second control grids of the tubes 40 and 41 respectively.

The winding sense of the secondary of the transformer 45 is chosen to be so that a signal $-2\cos(2\omega t+2\varphi)$ is operative at the second control grid of the tube 40, while the signal $+2\cos(2\omega t+\varphi)$ is applied to the second control grid of the tube 41.

The anodes of the tubes 40 and 41 are connected together and the said common anode circuit is provided with a band filter 7 which comprises a primary circuit consisting of the inductance 48 and the capacitor 49 and a secondary circuit consisting of the inductance 50 and the capacitor 51. The inductances 48 and 50 are coupled together magnetically.

Since, as a result of the connection of the anodes of the tubes 41 and 40, the sum of the anode currents of the said tubes will flow through the band filter 47 and the signal with the double subcarrier wave frequency is applied in opposite phase to the second control grid, the said signal with the double subcarrier wave frequency will not occur in the output signal. In addition, however, the band filter 47 is tuned to the subcarrier wave frequency $\omega$ so that for this reason also the signal with the double subcarrier wave frequency cannot penetrate to the output.

From the above it follows that during the odd lines the anode current of the tube 40 is proportional to $$\{P\cos(\omega t+\varphi)+R\sin(\omega t+\varphi)\}\cdot\{1-2\cos(2\omega t+2\varphi)\} \qquad (17)$$

while the anode current of the tube 41 is proportional to $$\{P\cos(\omega t+\varphi)+R\sin(\omega t+\varphi)\}\cdot\{1+2\cos(2\omega t+2\varphi)\} \qquad (18)$$

In Equations 17 and 18 the factor 1 represents the direct amplification of the tubes 40 and 41 which in this case is assumed to be 1.

Since the two anode currents in the band filter 47 are added together, it will be clear that the output terms caused by mixing, neutralize one another and that only the directly amplified signals occur in the output current. The said output current is consequently proportional to $$2P\cos(\omega t+\varphi)+2R\sin(\omega t+\varphi) \qquad (19)$$

The output signal of the mixer stage during the odd lines therefore is equal to the signal A which was applied to the input terminal 2 during the said lines but only with an amplitude which is twice as large.

During the even lines the signal B is applied to the input terminal 2 so that during the said even lines the anode current of the tube 40 is proportional to $$-\{P\cos(\omega t+\varphi)-R\sin(\omega t+\varphi)\}\cdot\{1-2\cos(2\omega t+2\varphi)\}=-P\cos(\omega t+\varphi)+R\sin(\omega t+\varphi)+P\cos(3\omega t+2\varphi)+P\cos(\omega t+\varphi)-R\sin(3\omega t+3\varphi)+R\sin(\omega t+\varphi)=2R\sin(\omega t+\varphi) \quad (20)$$

in which, as appears from Equation 20, the terms with $3\omega$ no longer occur in the resulting output signal because they are not passed by the band filter 47. Likewise, the anode current of the tube 41 during the even lines will be proportional to $$\{P\cos(\omega t+\varphi)-R\sin(\omega t+\varphi)\}\cdot\{1+2\cos(2\omega t+2\varphi)=P\cos(\omega t+\varphi)-R\sin(\omega t+\varphi)+P\cos(3\omega t+3\varphi)+P\cos(\omega t+\varphi)-R\sin(3\omega t+3\varphi)+R\sin(\omega t+\varphi)=2P\cos(\omega t+\varphi) \quad (21)$$

in which it is assumed again in the elaboration of Equation 21 that the band filter 47 does not pass the terms with $3\omega$.

The sum of the anode currents of the tubes 40 and 41 during the even lines consequently is proportional to $$2P\cos(\omega t+\varphi)+2R\sin(\omega t+\varphi) \quad (22)$$

and this is the same current as during the odd lines. From this it appears that the PAL signal has been converted again into an NTSC signal because the signal A according to Equation 3 appears at the secondary circuit of the band filter 47 both at the odd and at the even lines. When the signal B' is received instead of the signal B it will be clear that by inverting the phase of the signal with the double subcarrier wave frequency at the two second control grids of the tubes 40 and 41 again the same result can be achieved.

In addition, it will be clear that in a corresponding manner an NTSC signal can be converted into a PAL signal. In that case the signal A according to Equation 3 is applied to the terminal 2 both during the odd and the even lines but the signal A is formed at the output of the band filter 47 during the odd lines, naturally with an amplitude which is twice as large, and the signal B is formed during the even lines when during the odd lines the switch 1 connects the terminals 2 and 3 and, during the even lines, connects the terminals 2 and 4. In this latter case the delay circuit 8 with associated impedance 8' may be omitted. It is noted that the circuit arrangement shown in FIG. 4 may also be transistorized which transistors, however, will then mix according to the additive principle instead of according to the multiplicative principle.

A further advantage of the circuit arrangement shown in FIG. 4 with respect to that shown in FIG. 1 is that the two paths along which the signal is handled are identical. The only difference is that the transformer 44 is included in the path from the input terminal 2 to the first control grid of the tube 40. This transformer, however, may be a 1 to 1 transformer and moreover this is a passive element which is substantially not subject to ageing and does not suffer from voltage variations of voltages operative in the circuit arrangement shown in FIG. 4.

The tubes 40 and 41 may be identical tubes in which it has to be ensured only that the ratio between direct and conversion amplification is kept constant. Such a ratio, however, is independent of ageing of the tubes or voltage variations occurring so that the identity of the two paths through the tubes 40 and 41 remains guaranteed.

Of course, the transformer 44 serving as a phase inverter stage may be replaced by a tube or transistor circuit. In that case the phase inverter stage, however, again becomes dependent upon voltage variations and/or ageing phenomena.

The elimination of phase errors which may occur during the transmission of the color televsion signal and which cause color errors in the television image reproduced is one of the principal objects of the PAL system. As can easily be proved this elimination of the phase errors is fully maintained in a converter according to the invention.

For example, in the device according to FIG. 1 the color signal afflicted with a phase error will appear unchanged through the path of first output terminal 3 to adding stage 7. However, in the mixer stage 10 the color signal afflicted with substantially the same phase error will be multiplied by the signal with the double subcarrier wave frequency, as a result of which the phase error inverts its sign. (In the PAL system it is always assumed that the burst signal itself does not experience any phase shift during the transmission.) After adding the delayed and non-delayed signal at the output of the elements 8 and 8', the phase errors will consequently neutralize one another so that the utilimately obtained signal obtained after conversion of a PAL signal will contain no phase errors any more.

The same can be proved for the device shown in FIG. 4.

What is claimed is:

1. A circuit arrangement for converting a color television signal built up according to the PAL system into a signal built up according to the NTSC system, and conversely, in which the television signal contains, in addition to the luminance signal, two color components modulated in quadrature on a subcarrier wave and in which, in particular in the PAL signal, one of the said color components is shifted in phase from line to line through 180° and which circuit arrangement comprises a switch, means for the line-wise switching of said switch, and an adding stage, wherein the improvement comprises means for applying the color components modulated on the subcarrier wave to the adding stage through at least two paths, a source of oscillations of double subcarrier frequency, at least one of the said two paths containing a mixer stage, and means applying said oscillations with the double subcarrier wave frequency in addition to the color components to said mixer stage, said switch comprising one input terminal and two output terminals and being included in at least one of the two paths.

2. A circuit arrangement as claimed in claim 1, characterized in that the first of the two output terminals of the switch is directly coupled to the adding stage and the second is coupled to the adding stage through a mixer stage and in which the color components to be converted are applied to the input terminal, the said input terminal being connected to the first output terminal during one line and being connected to the second output terminal during the next line, the signal with the double subcarrier wave frequency applied to the mixer stage having such a phase that after mixing in the mixer stage one color component does not and the other component does shift in phase through 180°.

3. A circuit arrangement as claimed in claim 2, characterized in that the mixer stage is constructed as a push-pull mixer stage.

4. A circuit arrangement as claimed in claim 1, characterized in that a mixer stage is included in the two paths and the color components are directly applied to one mixer stage and are applied through the switch and a phase inverter stage to the other stage, on the understanding that the first output terminal of the switch is directly coupled and the second output terminal is coupled through the phase inverter stage to the input of the mixer stage in question, the signal with the double subcarrier wave frequency being applied in opposite phase to the two mixer stages.

5. A circuit arrangement as claimed in claim 1, characterized in that the output signal is derived from the adding stage through a delay circuit which delays the signal over one line period and through an impedance connected in parallel therewith which does not delay the signal but attenuates it as much as the delay circuit.

6. A color television circuit for reversing the phase in alternate lines of one color component signal of composite color television signals of the type comprising first and second color component signals modulated in quadrature on a subcarrier wave, said circuit comprising a source of said color television signals, first and second channels, output circuit means comprising means for adding the outputs of channels, switch means connected to said source for applying alternate lines of said color television signals to said first and second channels, and a source of reference oscillations of twice the frequency of said subcarrier wave, one of said channels comprising mixing means for mixing said reference oscillations with said color television signals.

7. A color television circuit for reversing the phase in alternate lines of one color component signal of composite color television signals of the type comprising first and second color component signals modulated in quadrature on a subcarrier wave, said circuit comprising a source of said color television signals, switch means having a common input terminal connected to said source and first and second output terminals, said switching means comprising means for connecting said common terminal to said first and second terminals on alternate lines of said color television signal, output circuit means comprising adding means, means connecting said first terminal directly to said adding means, a source of reference oscillations of twice the frequency of said subcarrier wave, and mixing means connected between said second terminal and said adding means for mixing said reference oscillations and said color television signals.

References Cited

UNITED STATES PATENTS

| | | | |
|---|---|---|---|
| 3,073,894 | 1/1963 | De France ---------- | 178—5.4 |
| 3,238,292 | 3/1966 | Odenhoven et al. ----- | 178—5.4 |

ROBERT L. GRIFFIN, *Primary Examiner.*

R. MURRAY, *Assistant Examiner.*